US006742263B2

(12) United States Patent
Ellson et al.

(10) Patent No.: US 6,742,263 B2
(45) Date of Patent: Jun. 1, 2004

(54) FILAMENT TRIMMER WITH ADJUSTABLE CUTOFF BLADE

(76) Inventors: Bart T. Ellson, 1700 Teal Cir., Excelsior, MN (US) 55331; Chadwick A. Shaffer, 1888 Heron Ave. N., Oakdale, MN (US) 55128; Thomas J. Beckey, 4903 Arden Ave., Edina, MN (US) 55424

( * ) Notice: Subject to any disclaimer, the term of this patent is extended or adjusted under 35 U.S.C. 154(b) by 0 days.

(21) Appl. No.: 10/117,683

(22) Filed: Apr. 4, 2002

(65) Prior Publication Data

US 2003/0188436 A1 Oct. 9, 2003

(51) Int. Cl.[7] .................................................. B26B 7/00
(52) U.S. Cl. ........................................... 30/276; 30/123
(58) Field of Search ................................. 30/276, 123

(56) References Cited

U.S. PATENT DOCUMENTS

| 4,366,621 A | 1/1983 | Mitchell |
| 5,010,720 A | 4/1991 | Corsi |
| 5,048,187 A | 9/1991 | Ryan |
| 5,060,383 A | 10/1991 | Ratkiewich |
| 5,107,665 A | 4/1992 | Wright |
| 5,351,403 A | * 10/1994 | Becker et al. ................ 30/276 |
| 6,347,455 B2 | * 2/2002 | Brant et al. .................... 30/276 |

* cited by examiner

*Primary Examiner*—Charles Goodman
(74) *Attorney, Agent, or Firm*—James W. Miller

(57) ABSTRACT

A filament trimmer includes a rotatable trimmer head having an outwardly extending filament. The trimmer has a rear shield and a front wire guard. A cutoff blade is adjustably mounted on the rear shield to move between two different radially inward and outward positions. In the radially outward position, the cutoff blade cuts off the filament at a length in which the filament extends beyond the front guard prior to the filament becoming shortened due to breakage or wear. In the radially inward position, the cutoff blade cuts off the filament at a length in which the filament extends short of the front guard prior to the filament becoming shortened due to breakage or wear.

17 Claims, 5 Drawing Sheets

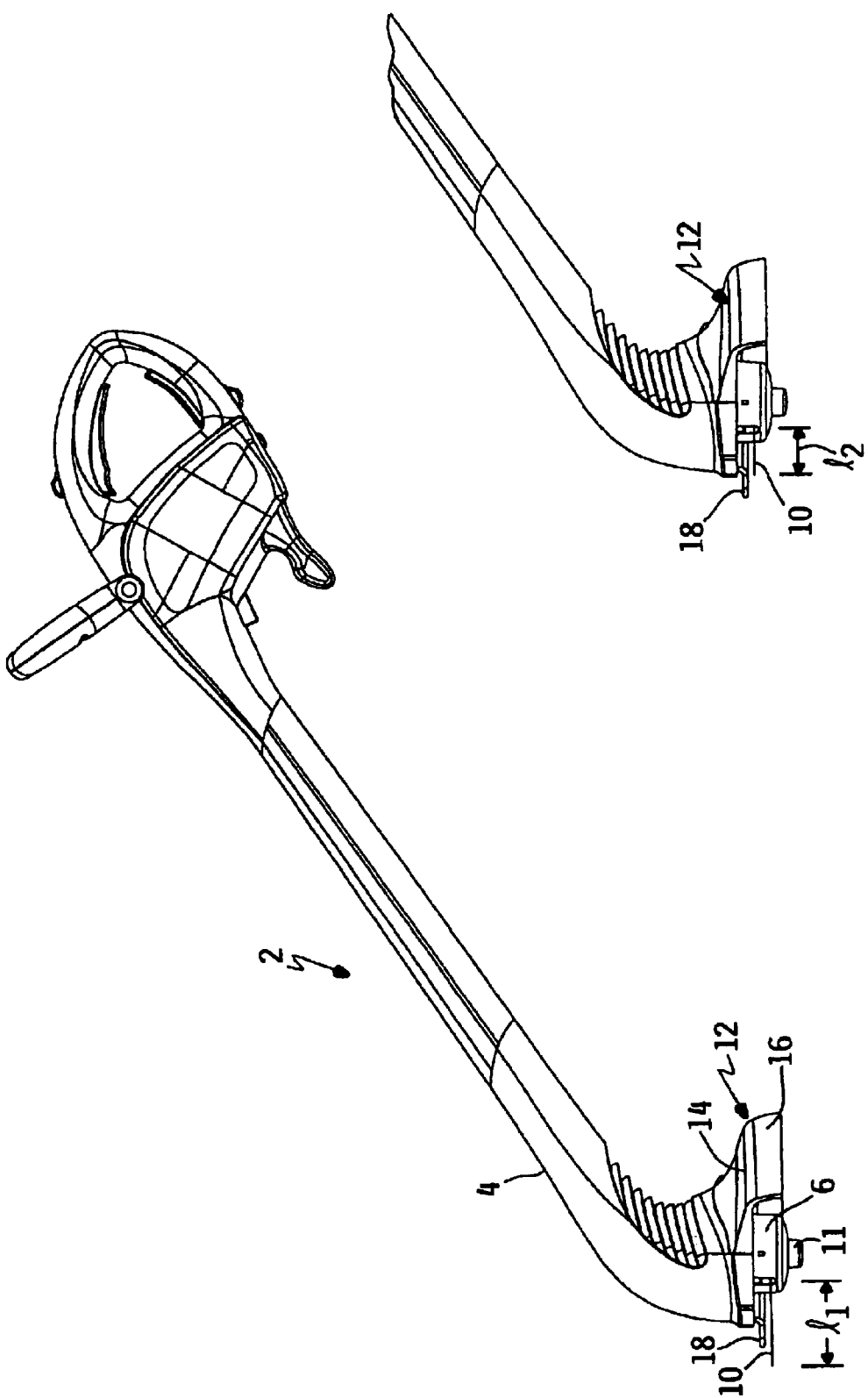

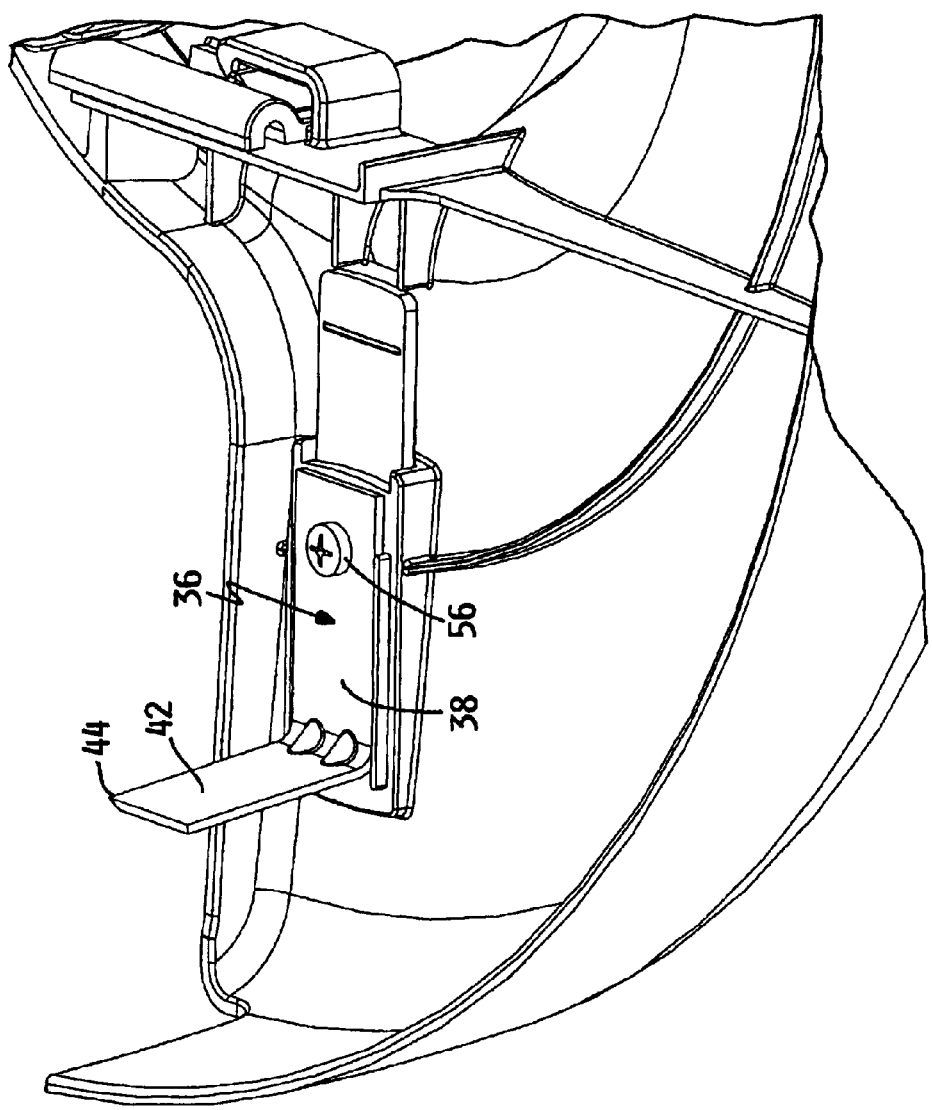

US 6,742,263 B2

FILAMENT TRIMMER WITH ADJUSTABLE CUTOFF BLADE

TECHNICAL FIELD

This invention relates to a filament trimmer having an outwardly extending flexible filament that cuts grass or other ground growing vegetation when the filament is rotated in a cutting plane. More particularly, this invention relates to a filament trimmer having a cutoff blade for cutting the filament to a predetermined length.

BACKGROUND OF THE INVENTION

Filament trimmers are well known lawn and garden implements. Such a trimmer includes a rotatable trimmer head that has an outwardly extending flexible filament. When the trimmer head is rotated by a drive contained on the trimmer, the filament is spun in a cutting plane to be able to sever grass or other ground growing vegetation. The drive for rotating the trimmer head may be an electrical motor operated by an electrical power source, e.g. a battery on the trimmer or an external electric power cord plugged into the trimmer. The drive may also be a drive shaft operated by an internal combustion engine carried on the trimmer.

Many filament trimmers have a filament feed system for replenishing the filament as the filament becomes shortened due to breakage or wear. Essentially, the feed system feeds out new filament from a supply of filament maintained within the trimmer head with the new filament serving to increase the length the filament extends outwardly from the trimmer head. Because the filament feeding occurs rapidly and also often feeds out filament in discrete increments, it is difficult to precisely control the length of the filament during a replenishment operation. Thus, most filament trimmers employ a cutoff blade that cuts the filament to a desired predetermined length at the conclusion of a filament replenishment operation.

The cutoff blade in prior filament trimmers is fixed in a single location on the trimmer. This provides the filament with a single predetermined length when the filament has just been replenished and is fresh, i.e. prior to the filament having become shortened due to wear or breakage. The Applicants have discovered that there are some circumstances in which it would be desirable to be able to vary the length of a fresh or newly replenished filament. For example, when trimming grass over a large, unobstructed expanse, a relatively long filament is desirable. When trimming in close quarters or near delicate vegetation, a shorter filament might be better. However, prior to this invention, there has not been any way to selectively vary the length of the filament in a filament trimmer.

SUMMARY OF THE INVENTION

This invention relates to a filament trimmer having at least one cutoff blade for establishing a predetermined length of a filament when the filament is new prior to the filament being shortened due to breakage or wear. The cutoff blade is adjustably carried on the trimmer to allow the operator to selectively change the predetermined length of the filament when the filament is newly replenished.

One aspect of this invention relates to a filament trimmer that comprises a rotatable trimmer head carried on a housing. The trimmer head includes an outwardly extending filament that cuts grass or other ground growing vegetation when the trimmer head is rotated. The trimmer head includes a filament feed system that replenishes the length of the filament when the filament is shortened due to breakage or wear. A cutoff blade is provided on the trimmer housing such that the filament contacts the cutoff blade as its length increases during replenishment of the filament by the filament feed system. The cutoff blade cuts the filament to a predetermined length at the conclusion of filament replenishment. The cutoff blade is selectively movable by the operator between at least two different positions on the trimmer housing to allow the operator to select a longer or shorter predetermined length for a newly replenished filament.

BRIEF DESCRIPTION OF THE DRAWINGS

This invention will be described more completely in the following Detailed Description, when taken in conjunction with the following drawings, in which like reference numerals refer to like elements throughout.

FIG. 1 is a side elevational view of a filament trimmer according to this invention, particularly illustrating a newly replenished filament having a first predetermined length $l_1$ that extends beyond the front guard on the trimmer;

FIG. 2 is a partial side elevational view of a filament trimmer according to this invention, particularly illustrating a newly replenished filament having a first predetermined length $l_2$ that extends short of the front guard on the trimmer;

FIG. 6 is an enlarged perspective view from below of a portion of the filament trimmer shown in FIG. 1, further illustrating the reciprocal slide embodiment of the adjustable cutoff blade shown in FIG. 5.

DETAILED DESCRIPTION

Figure 3:
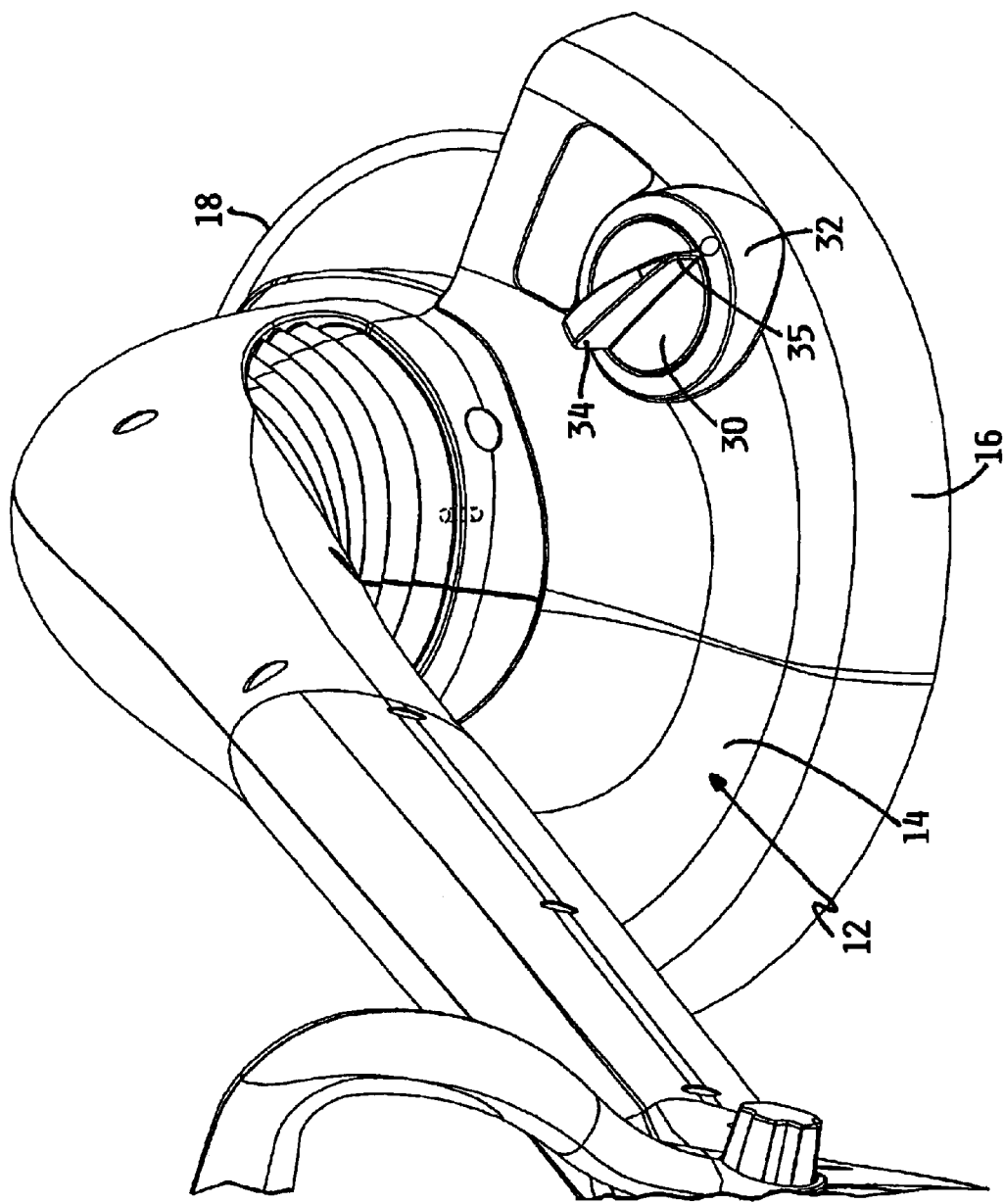
FIG. 3 is an enlarged perspective view from above of a portion of the filament trimmer shown in FIG. 1, particularly illustrating a first embodiment of an adjustable cutoff blade mounted on a rotary knob.

A filament trimmer according to this invention is illustrated generally as 2. Trimmer 2 includes a housing 4 carrying a rotatable trimmer head 6 at the lower end of housing 4. Housing 4 includes a handle 8 at the upper end of housing 4 to allow the operator to grip and hold trimmer 2. A drive is provided in housing 4 for rotating trimmer head 6. When the drive is powered and trimmer head 6 is rotated, a flexible filament 10 extending outwardly from trimmer head 6 is spun in a cutting plane to sever grass or other ground growing vegetation.

Trimmer head 6 preferably includes a filament feed system that replenishes the flexible filament when filament 10 is shortened due to use. Trimmer head 6 comprises a ground bump head having a ground bump button 11. This allows the operator to selectively actuate the filament feed system by bumping ground bump button 11 against the ground to feed out new filament in a filament replenishment operation. The structural and operational details of ground bump heads are well known in the filament trimmer art and need not be further described herein. U.S. Pat. No. 6,279,235, assigned to the assignee of this invention, discloses one such ground bump head and is hereby incorporated by reference.

Alternatively, trimmer head 6 could use a filament feed system that operates automatically without conscious operator action, such as an automatic feed trimmer head that is responsive to centrifugal force and how centrifugal force changes as filament 10 shortens to automatically feed out additional filament when filament 10 shortens more than is desired. Additionally, trimmer head 6 could comprise a manual feed trimmer head in which the trimmer is stopped, the filament feed system in the trimmer head is unlocked, and the operator then manually pulls out additional filament from the trimmer head. Thus, the nature of the filament feed system used in trimmer head 6 is not important to this invention.

Housing 4 of trimmer 2 includes a rear shield 12 having a top wall 14 and a downwardly extending peripheral wall 16. Rear shield 12 is generally semi-circular in shape, i.e. rear shield 12 has a circumferential length between 90° and 180° as shown in FIG. 3. Rear shield 12 helps protect the operator from contact with filament 10 and from contact with grass or vegetation debris generated by the cutting action of filament 10. Such rear shields are typically found on trimmers 2.

Figure 4:
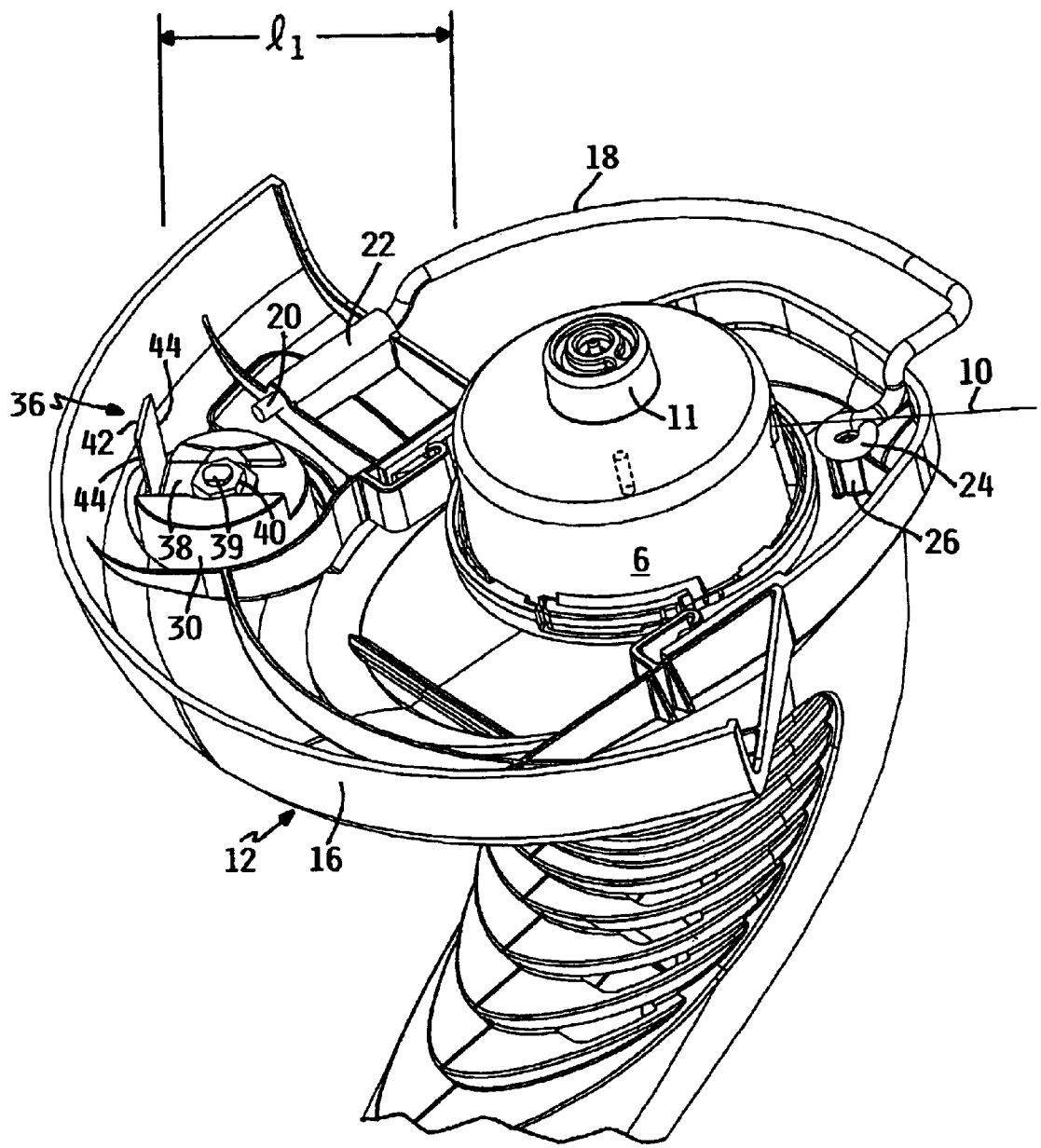
FIG. 4 is an enlarged perspective view from below of a portion of the filament trimmer shown in FIG. 1, further illustrating the rotary knob embodiment of the adjustable cutoff blade shown in FIG. 3.

Housing 4 of trimmer 2 also includes a front wire guard 18 extending forwardly from rear shield 12. As shown in FIG. 4, the ends of wire guard 18 are attached to rear shield 12 with one end 20 slipping into a sleeve 22 on rear shield 12 and the other end 24 being looped to allow that end 24 to be screwed into a threaded boss 26 on rear shield 22. Wire guard 18 has an arcuate shape extending around 90° or so and, except for its ends 20 and 24, is at a generally constant radius from the rotational axis of trimmer head 6. Wire guard 18 allows the operator to more safely hold trimmer 2 up against or near delicate objects, such as flowers, as will be explained in more detail hereafter.

A rotary knob 30 is rotatably journalled on rear shield 12 in a hub or bearing 32. As shown in FIG. 3, the upper portion of knob 30 includes a handle 34 to allow the operator to grip and rotate knob 30. As shown in FIG. 4, the lower portion of knob 30 carries an L-shaped cutoff blade 36. Cutoff blade 36 has a horizontal mounting leg 38 bolted to knob 30 by a bolt 39 and nut 40. Cutoff blade 36 also has a vertical cutting leg 42 having sharpened cutting edges 44 on either side thereof.

When filament 10 is replenished by operation of the filament feed system in trimmer head 6, the filament will be lengthened in discrete increments. Cutoff blade 36 cuts filament off 10 at the conclusion of a filament replenishment operation so that a newly replenished filament 10 will have a predetermined length, indicated as $l_1$ in FIGS. 1 and 4. This length is governed by the radial distance between trimmer head 6 and cutting leg 42 of cutoff blade 36.

Mounting cutoff blade 36 on rotary knob 30 allows cutoff blade 36 to be located in two different operational positions on rear shield 12 to allow the operator to selectively choose between two different predetermined lengths for a newly replenished filament 10. When rotary knob 30 is located as shown in FIGS. 2 and 3, cutoff blade 36 is located at its radially outermost position relative to trimmer head 6 to provide a first predetermined length $l_1$ for a newly replenished filament 10. Length $l_1$ is longer than the radial distance between trimmer head 6 and wire guard 18. Length $l_1$ is, however, shorter than the radial distance between trimmer head 6 and peripheral wall 16 of rear shield 12. This relatively long length $l_1$ of a newly replenished filament is most effective when trimming grass over an open, unconfined space, such as when trimming grass without any adjacent objects or vegetation to be concerned about.

If the operator wishes to trim near vegetation that is delicate, such as flowers in a flower bed, rotary knob 30 can be rotated 180° to move cutting leg 42 of cutoff blade 36 to a radially inward position compared to that shown in FIG. 4. The operator simply grips handle 34 and turns handle 34 around by 18020 from the position shown in FIG. 3 until the tapered outer end 35 of handle 34 points inwardly rather than outwardly. Once cutoff blade 36 has been so adjusted, the other cutting edge 44 on cutting leg 42 will now cut filament off 10 at a shorter, predetermined length, shown as $l_2$ in FIG. 2. Length $l_2$ is shorter than the radial distance between trimmer head 6 and wire guard 18 so that newly replenished filament 10 extends short of wire guard 18 as shown in FIG. 2. Thus, the operator can trim around delicate objects, such as flowers, without fear of damaging such objects as wire guard 18 will prevent even a newly replenished filament 10 from contacting such objects.

Trimmer 2 equipped with an adjustable cutoff blade 36 as shown herein provides the operator with more operational flexibility. If the operator wishes to trim without concern to adjacent objects, the operator can adjust rotary knob 30 to provide a newly replenished filament 10 having a long predetermined length $l_1$ to maximize its cutting effectiveness. If trimming is to be done more carefully and close to objects that should not be touched by filament 10, the operator can adjust rotary knob 30 to provide a newly replenished filament 10 having a shorter length $l_2$ that does not extend beyond wire guard 18.

Figure 5:
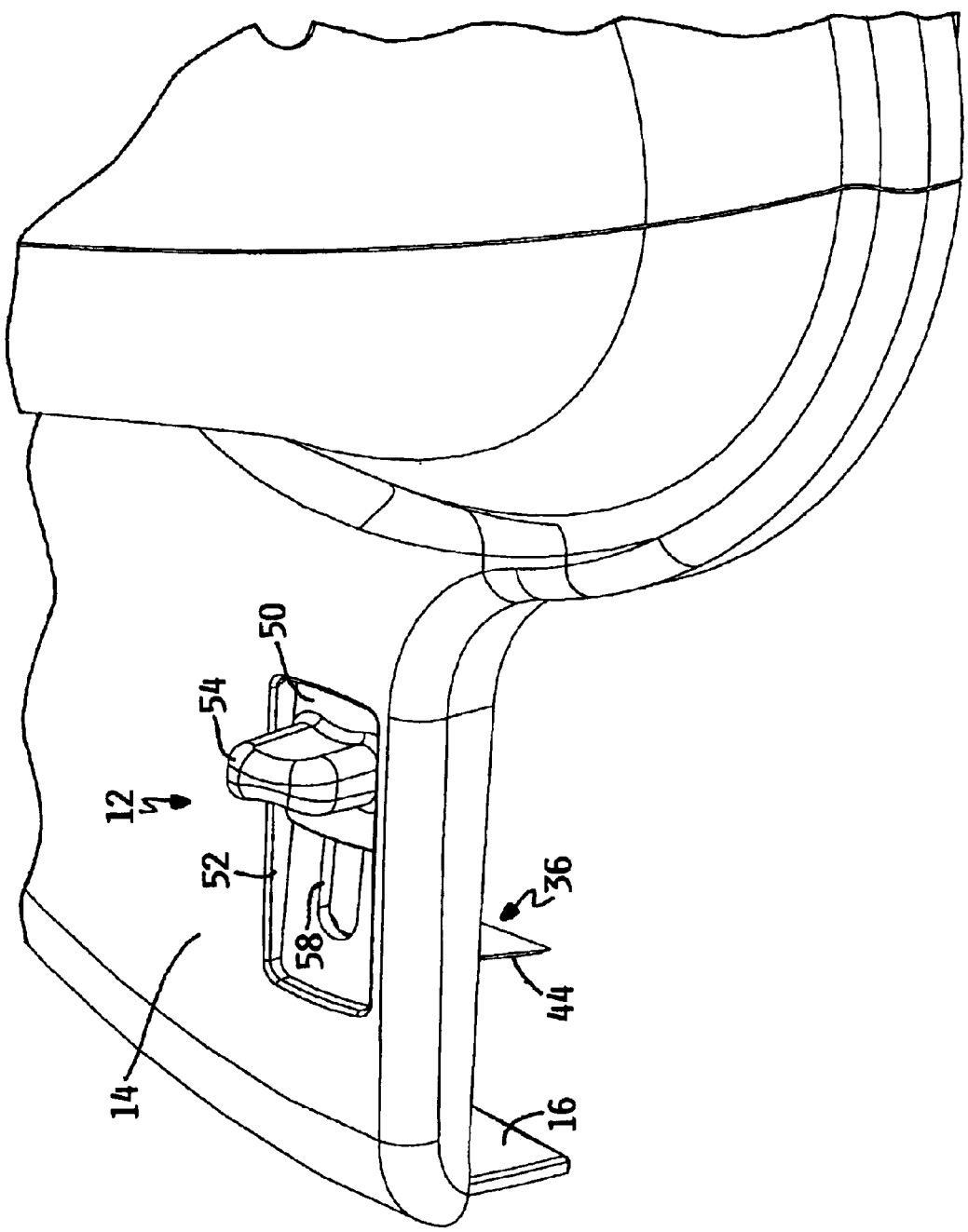
FIG. 5 is an enlarged perspective view from above of a portion of the filament trimmer shown in FIG. 1, particularly illustrating a second embodiment of an adjustable cutoff blade mounted on a reciprocal slide.

FIGS. 5 and 6 show a second embodiment of an adjustable cutoff blade 36 according to this invention. In this embodiment, rotary knob 30 is replaced with an adjustable reciprocal slide 50 that is slideable in a radially extending slideway 52 on rear shield 12. The top of slide 50 includes a handle 54 for allowing the operator to grip slide 50 and move it back and forth between different adjusted positions. A screw 56 attaches cutoff blade 36 to the bottom of slide 50, the shank of screw 56 passing upwardly through an elongated slot 58 at the bottom of slideway 52. The vertical cutting leg 42 of cutoff blade 36 includes only a single sharpened cutting edge 44 along the one side of leg 42 that is contacted by filament 10 during a filament replenishment operation as trimmer head 6 is rotated in its usual direction of rotation.

When slide 50 is in its radially inwardmost position at one end of slideway 52 as shown in FIG. 5, the cutting leg 42 of cutoff blade 36 is also in its radially inwardmost position to provide a newly replenished filament with a predetermined length $l_2$ that falls short of wire guard 18. The operator can selectively move slide 50 radially outwardly until slide 50 reaches its radially outermost position at the other end of slideway 52. In this position, the cutting leg 42 of cutoff blade 36 provides a newly replenished filament with a predetermined length $l_1$ that extends beyond wire guard 18.

Obviously, the operator could stop moving slide 50 between the ends of slideway 52 to provide a plurality of additional adjusted positions for cutoff blade 36 to provide additional predetermined lengths for a newly replenished filament 10, if so desired. Slide 50 is infinitely adjustable within slideway 52 governed only by the relative length of slideway 52 compared to the size of slide 50.

Detents (not shown) could be provided between knob 30 and hub 32, or between slide 50 and slideway 52, to hold or lock knob 30 or slide 50 in their various adjusted positions. Alternatively, a friction fit can be used to hold knob 30 or slide 50 in their various adjusted positions. The pointed end 35 of handle 34 on knob 30 helps inform the operator of which adjusted position knob 30 is in. The relative inward or outward location of slide 50 within slideway 52 inherently informs the operator of the same thing with respect to the reciprocal slide embodiment.

Various modifications of this invention will be apparent to those skilled in the art. For example, rear shield 12 could be provided with two radially spaced mounting slots for a cutoff blade 36, with the cutoff blade 36 simply being dropped down into one or the other of the two slots to provide the two lengths $l_1$ and $l_2$ for a newly replenished filament 10. Two retractable cutoff blades 36 could be provided at radially spaced locations on rear shield 12 with a first blade 36 being extended down into a position in which it can cut off filament 10 and with the other blade 36 being retracted out of the plane of rotation of filament 10. To change between the two lengths $l_1$ and $l_2$, the operator would simply reverse the positions of the two blades, i.e. retract the first blade and extend the second blade.

Thus, this invention shall be limited only by the appended claims.

We claim:

1. A filament trimmer, which comprises:
    a) a housing;
    b) a rotatable trimmer head on the housing with the trimmer head having a filament extending outwardly therefrom in a cutting plane when the trimmer head is rotated, wherein the trimmer head includes a filament feed system for replenishing the filament as the filament becomes shortened due to breakage or wear, the filament being provided with a predetermined length by a cutoff blade acting to sever any excess filament extending radially beyond the cutoff blade at the conclusion of a filament replenishment operation;
    c) means for permitting an operator to selectively vary the predetermined length of the filament provided by the cutoff blade.

2. The filament trimmer of claim 1, wherein the trimmer includes a front guard on the housing extending forwardly of the trimmer head, and wherein the length varying means provides at least first and second different predetermined lengths of the filament when the filament is newly replenished with the first predetermined length extending beyond the front guard and the second predetermined length extending short of the rear guard.

3. The filament trimmer of claim 1, wherein the length varying means comprises at least one adjustable cutoff blade on the housing.

4. The filament trimmer of claim 1, wherein the length varying means comprises an adjustable cutoff blade on the housing, and wherein the cutoff blade is movable relative to the housing between at least two different positions to provide the first and second different predetermined lengths of the filament.

5. The filament trimmer of claim 4, wherein the cutoff blade rotates on the housing to move between the different positions of the cutoff blade.

6. The filament trimmer of claim 5, wherein the cutoff blade slides on the housing to move between the different positions of the cutoff blade.

7. A filament trimmer, which comprises:
    a) a rotatable trimmer head carried on a housing, wherein the trimmer head includes an outwardly extending filament that cuts vegetation when the trimmer head is rotated;
    b) at least one cutoff blade for establishing a predetermined length of the filament when the filament is new prior to the filament being shortened due to breakage or wear; and
    c) wherein the cutoff blade is adjustably carried on the housing to allow the operator to selectively change the predetermined length of the filament.

8. A filament trimmer, which comprises:
    a) a rotatable trimmer head carried on a housing, wherein the trimmer head includes an outwardly extending filament that cuts vegetation when the trimmer head is rotated, wherein the trimmer head further includes a filament feed system that replenishes the length of the filament when the filament is shortened due to breakage or wear;
    b) a cutoff blade on the trimmer housing such that the filament contacts the cutoff blade as its length increases during replenishment of the filament by the filament feed system, wherein the cutoff blade cuts the filament to a predetermined length during filament replenishment; and
    c) wherein the cutoff blade is selectively movable by the operator between at least two different positions on the trimmer housing to allow the operator to select a longer or shorter predetermined length for the filament.

9. The filament trimmer of claim 8, wherein the cutoff blade is mounted on a rotary knob carried on the housing.

10. The filament trimmer of claim 8, wherein the rotary knob is rotatable on the housing between two different positions located approximately 180° apart.

11. The filament trimmer of claim 10, wherein the cutoff blade is L-shaped having a horizontal leg mounted to an underside of the rotary knob and a vertical leg, and wherein the vertical leg is provided with two cutting edges with one cutting edge being located on each side of the vertical leg such that one cutting edge is positioned to engage and cut off the filament regardless of the position of the rotary knob.

12. The filament trimmer of claim 8, wherein the cutoff blade is mounted on a reciprocal slide carried on the housing.

13. The filament trimmer of claim 12, wherein the cutoff blade is b-shaped having a horizontal leg mounted to an underside of the slide and a vertical leg, and wherein the vertical leg is provided with a cutting edge along one side thereof.

14. The filament trimmer of claim 8, wherein the trimmer housing includes a rear shield having a top wall and a peripheral wall extending downwardly from the top wall, wherein the cutoff blade is adjustably movable on the top wall of the rear shield.

15. The filament trimmer of claim 8, further including a front guard on the housing extending forwardly of the trimmer head, and wherein the longer and shorter predetermined lengths for the filament extend beyond and short of the front guard, respectively.

16. The filament trimmer of claim 15, wherein the front guard is a wire guard.

17. A filament trimmer, which comprises:
    a) a rotatable trimmer head having an outwardly extending filament;
    b) a rear shield and a front guard;
    c) a cutoff blade adjustably mounted on the rear shield to move between two different radially inward and outward positions;
    d) wherein the cutoff blade, in the radially outward position thereof, cuts off the filament at a length in which the filament extends beyond the front guard prior to the filament becoming shortened due to breakage or wear; and
    e) wherein the cutoff blade, in the radially inward position thereof, cuts off the filament at a length in which the filament extends short of the front guard prior to the filament becoming shortened due to breakage or wear.

* * * * *

UNITED STATES PATENT AND TRADEMARK OFFICE
CERTIFICATE OF CORRECTION

PATENT NO. : 6,742,263 B2  Page 1 of 1
DATED : June 1, 2004
INVENTOR(S) : Bart T. Ellson et al.

It is certified that error appears in the above-identified patent and that said Letters Patent is hereby corrected as shown below:

Column 5,
Line 45, change "claim 1" to -- claim 2 --.
Line 53, change "claim 5" to -- claim 4 --.

Column 6,
Line 34, change "b-shaped" to -- L-shaped --.

Signed and Sealed this

Seventeenth Day of August, 2004

JON W. DUDAS
*Acting Director of the United States Patent and Trademark Office*